Jan. 19, 1960 J. R. FULLERTON ET AL 2,922,025
CONSTANT PRESSURE, MULTIPLE WHEEL WELDING HEAD
Filed July 21, 1958 2 Sheets-Sheet 1

INVENTORS.
JOHN R. FULLERTON
LAWRENCE E. LEECH
DONALD L. HEYSER
By Knox & Knox

Jan. 19, 1960   J. R. FULLERTON ET AL   2,922,025
CONSTANT PRESSURE, MULTIPLE WHEEL WELDING HEAD
Filed July 21, 1958   2 Sheets-Sheet 2

INVENTORS.
JOHN R. FULLERTON
LAWRENCE E. LEECH
DONALD L. HEYSER

By  Knox & Knox

United States Patent Office 2,922,025
Patented Jan. 19, 1960

2,922,025

CONSTANT PRESSURE, MULTIPLE WHEEL WELDING HEAD

John R. Fullerton and Lawrence E. Leech, San Diego, and Donald L. Heyser, Lemon Grove, Calif., assignors to Ryan Aeronautical Co., San Diego, Calif.

Application July 21, 1958, Serial No. 749,814

5 Claims. (Cl. 219—81)

The present invention relates generally to electrical resistance welding and more particularly to a constant pressure, multiple wheel welding head.

The primary object of this invention is to provide a welding head having multiple wheel type electrodes which are individually pressurized from a common source of pressure, so that each wheel is held against the work with a constant pressure regardless of small surface irregularities.

Another object of this invention is to provide a welding head in which the individually pressurized wheel electrodes are collectively mounted on a single pressurized support having a range of movement considerably greater than the individual range of movement of the electrodes themselves, whereby the head as a unit is adapted to accommodate for gross vertical movements occasioned by contour variation, while the minor local variations are compensated for by the individual electrode mounting means, and the electrodes are able to pass over contoured surfaces while maintaining a constant contact pressure on all parts of the work surface.

Another object of this invention is to provide a welding head which maintains a constant contact pressure while each weld is made and immediately thereafter during the follow-up period while the weld is cooling, so ensuring a proper bond.

A further object of this invention is to provide a welding head in which the electrodes are easily adjustable as to spacing and may be adapted for various types of work.

Finally, it is an object to provide a welding head which is simple and convenient to operate and which will ensure accurate and uniform welds.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

Similar characters of reference indicate similar or identical elements and portions throughout the specification and throughout the views of the drawings.

Figure 2:
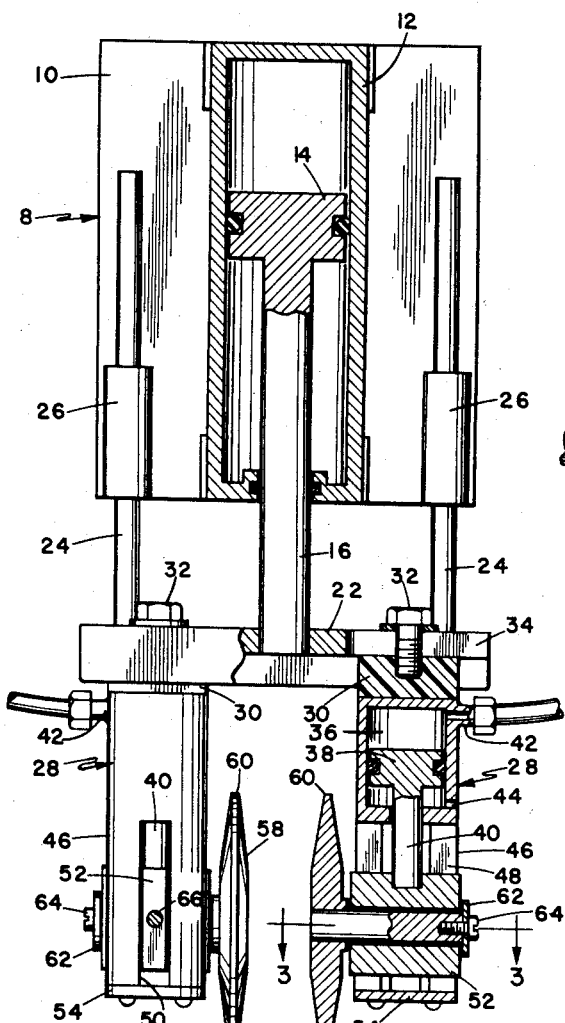
Figure 2 is a sectional view taken on the line 2—2 of Figure 1, parts being shown in full for clarity.
Figure 1:
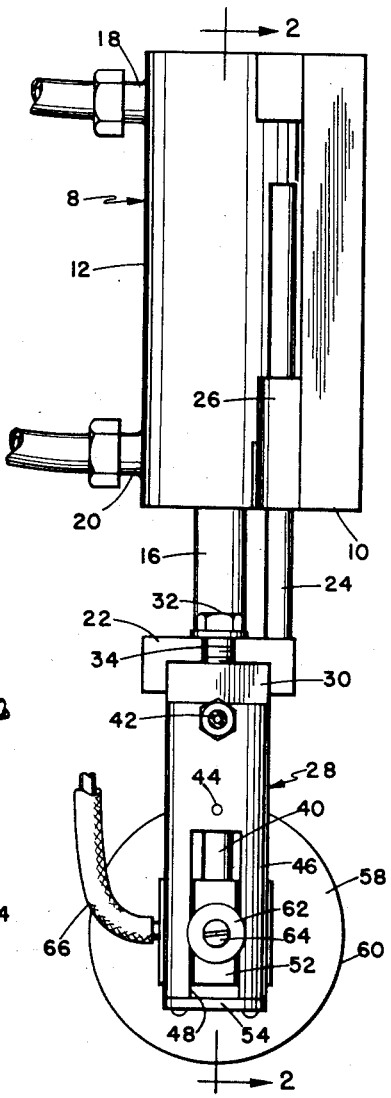
Figure 1 is a side elevation view of the welding head.
Figure 3:
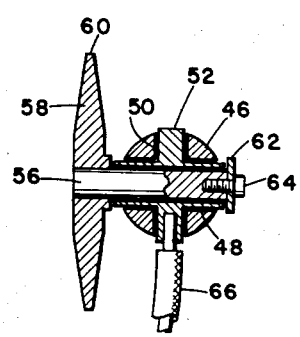
Figure 3 is a sectional view taken on the line 3—3 of Figure 2.

Referring now to the structure in detail, the welding head comprises a main mounting plate 10 on which is fixed a long stroke, primary air cylinder 12 having a piston 14 and a downwardly extended piston rod 16. The cylinder 12 has a pair of inlets 18 and 20 adjacent its ends to admit pressurized air above or below the piston 14. It should be noted that, while air is referred to as the pressurizing medium, hydraulic means may be used as an alternative, although at the relatively low working pressures used in welding air is more practical and has a desirable cushioning property.

Fixed to the lower end of the piston rod 16 is an inverted U-shaped support channel 22 extending on both sides thereof, and projecting upwardly from opposite ends of said support channel are guide rods 24, which slide in tubular guides 26 fixed on the mounting plate 10, so preventing the support channel from rotating about the axis of the cylinder 12. Mounted in the support channel 22 are two short stroke, single action, secondary air cylinders 28 having upper end blocks 30 which are shaped to fit closely inside said channel and prevent the cylinders from rotating. The end blocks 30 are of non-conductive material to insulate the individual electrodes and are secured to the cylinders 28 in any suitable manner. The cylinders 28 are secured by bolts 32 which screw into the upper ends 30 and pass through suitable slots 34 cut longitudinally in the support channel 22, so that the cylinders are adjustable as to spacing. Each secondary cylinder 28 contains a bore 36 in which is a piston 38 having a downwardly extended piston rod 40, said bore having an air inlet 42 at the upper end above the piston and a lower portion of each cylinder 28 comprises a sleeve extension 46 having a diametrical and axially extending guide slot 48, the guide slots of the two cylinders being coplanar. Each cylinder 28 also has a diametrical and axially extending alignment slot 50, normal to the guide slot 48 and forming therewith a cruciform slot arrangement. Slidably mounted in each sleeve extension 46 is a cruciform journal block 52, which is a close sliding fit in the slots 48 and 50 and is connected to the end of the piston rod 40, the lower end of said sleeve extension being closed by a cap plate 54. An axle 56 is freely rotatably mounted in the journal block 52 normal to the axis of the cylinder 28 and fixed to one end of said axle is a wheel electrode 58 having a narrow contact rim 60, said axle being retained against axial displacement by a washer 62 and screw 64 at the other end thereof. The two cylinders 28 are oriented so that the axles 56 are coaxial and the wheel electrodes 58 are adjacent and parallel. Each journal block 52 is provided with a suitable conductor 66 to provide welding current to the wheel electrode 58, the large contact area between the axle 56 and the journal block ensuring proper transference of power through the rotatable unit.

As shown in the drawings, the welding head has two wheel electrodes 58 which are arranged to make spaced parallel rows of welds. However, any reasonable number of wheel electrodes 58, each with its own secondary cylinder 28, may be mounted on the assembly by merely extending or adding to the support channel structure 22. The specific number and pattern of arrangement of the electrodes is a matter of choice to suit a particular welding operation.

Figure 5:
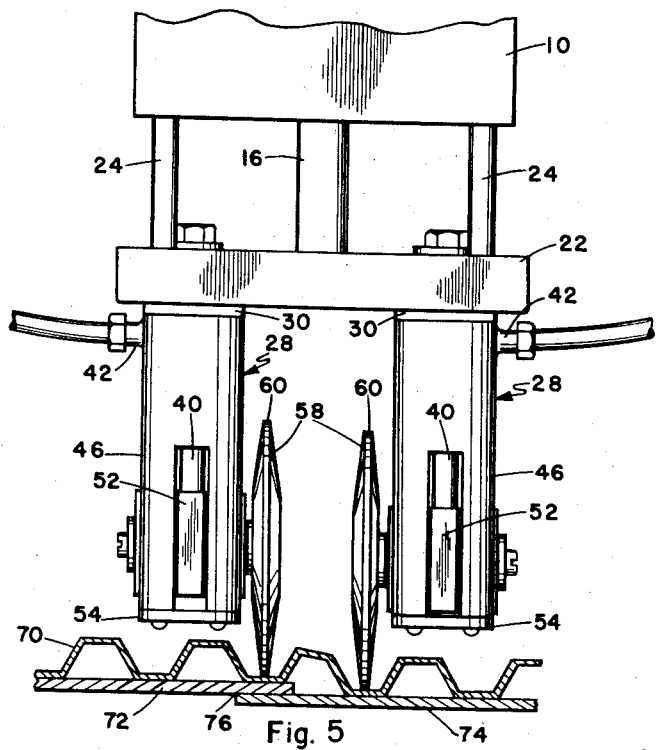
Figure 5 is a fragmentary rear elevation view of the welding head showing the manner in which the electrodes accommodate surface irregularities in a workpiece which is indicated in section.

In Figure 5, for example, the welding head is illustrated in use to weld a corrugated member 70 to a pair of plates 72 and 74 connected by an overlapping joint 76. The secondary cylinders 28 are spaced so that the wheel electrodes 58 are aligned with the base portions of an adjacent pair of corrugations in the member 70, and the rolling wheel electrodes permit both corrugations to be quickly welded to the plates 72 and 74 along their full length. The welding head is then shifted laterally to weld the next pair of corrugations and the cycle repeated. By adding more electrodes, more corrugations can be welded at one stroke. In the particular structure illustrated in Figure 5, a definite step in surface level is caused by the overlapping joint 76. However, due to the independent pressurized mounting of each wheel electrodes 58, the electrodes adjust themselves to the surface without affecting the contact pressure.

The welding head is particularly suitable for pulse type resistance welding of thin materials in which structural accuracy and perfection of welds is essential. The materials are welded together by parallel rows of closely spaced spot welds to obtain a maximum area of weld without resorting to full surface welding which causes burning and distortion and is very difficult to control. Due to the large number of individual spot welds involved in such a process, the mechanism must be as automatic and reliable as possible, the quality of weld being determined by three major factors which are pressure, current and alignment. The alignment factor is well taken care of by the structure of the welding head which prevents twisting or offset from the path of motion of the head as a unit. Current is controlled easily at the source, which is not a specific part of the present disclosure, the exact current required being dependent on the particular welding operation. However, a separate supply of current is supplied to each individual wheel electrode 58 so that each can be accurately controlled, the insulating end blocks 30 providing electrical isolation between electrodes. Pressure is a very important factor, especially when welding thin materials, since the bead of each spot weld is necessarily small and must be correctly formed. To prevent cavitation due to contraction of the weld bead, pressure must be maintained on the weld area while each bead cools and this is accomplished by the wheel electrodes 58 which roll slowly along the lines of weld.

In the welding process in which the welding head is primarily used, pulses of welding current are used having a duration of a few microseconds or even a fraction of a millisecond so that, even though the electrodes are rolling continuously, the pressure remains on the weld area after the welding pulse is completed and while the bead is cooling. There is, therefore, a critical relationship between the speed of welding wheel advance and the duration of the welding pulse plus the cooling time for each weld, the upper limit for the former being that which assures that the wheel pressure is still being applied substantially immediately over the weld bead until the cooling is virtually complete.

Figure 4:
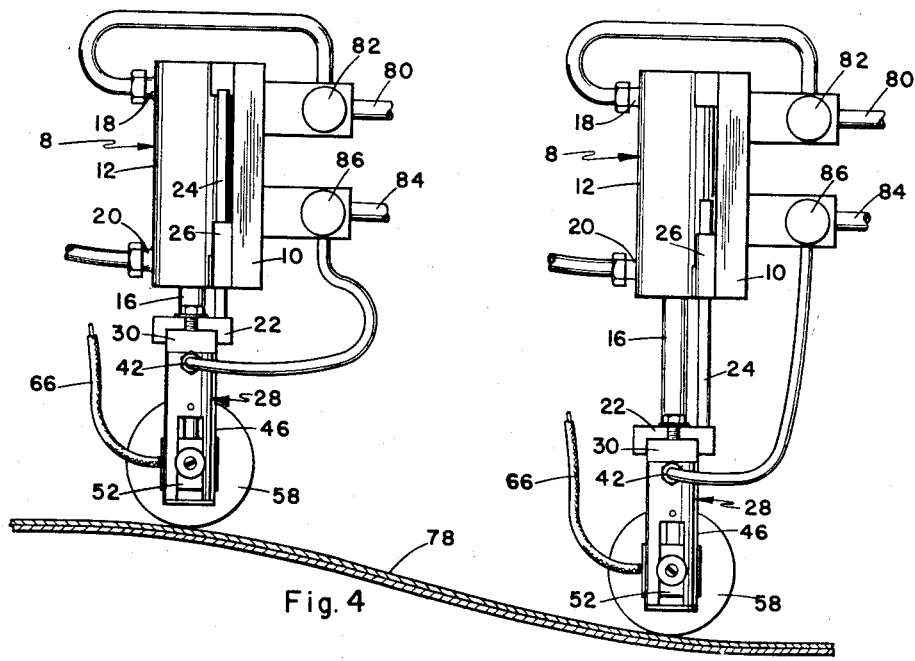
Figure 4 is a composite side elevation view on a reduced scale, showing the welding head in two different positions on a contoured work surface.

Besides accommodating surface irregularities by the independent mounting of each wheel electrode 58, the welding head is able to follow considerable contour variations in the work surface, such as when welding curved panels. As illustrated in Figure 4, the welding head follows the contoured surface of the workpiece 78 by the travel of the primary cylinder 12. The upper inlet 18 admits air to lower the electrode assembly to the work and, to ensure constant pressure, said inlet is connected to a source of pressure 80 through a constant pressure valve 82, which maintains a fixed pressure regardless of the degree of extension of the piston rod 16. The inlets 42 are connected to a common pressure source 84 through a further constant pressure valve 86 which maintains a constant, equal pressure in both secondary cylinders 28. Since the primary cylinder 12 is larger than the secondary cylinders 28, the pressure at the inlet 18 must be substantially equal to the total pressure on both wheel electrodes 58, in order that the pistons 14 and 38 all move as the wheel electrodes follow contours. If this pressure balance is not maintained, either the piston 16 or the pistons 38 will bottom in their respective cylinders, depending on which has the greater pressure. In actual practice, the pressure in the primary cylinder 12 is very slightly higher than the total pressure in the secondary cylinders 28, so that the pistons 38 never bottom while following contours. Thus, regardless of contour changes or surface variations, contact pressure of the electrodes on the work can be maintained at an accurate value. The air admitted to the lower inlet 20 is used to lift the electrode assembly clear of the work and may be connected to the common pressure source for convenience, or to a separate source.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

We claim:

1. A welding head, comprising: a long stroke, double acting, fluid pressure actuated cylinder having a piston therein; a rigid support member attached to said piston; a plurality of short stroke, single acting fluid pressure actuated cylinders adjustably mounted on said support member and each having a piston; a wheel electrode operatively connected to each of said last pistons; a common source of fluid pressure connected to said single acting cylinders to maintain equal and constant pressure between each electrode and a work surface; and a second source of pressure connected to said double acting cylinder to move the electrodes collectively into contact with a work surface.

2. A welding head, comprising: a long stroke, double acting, fluid pressure actuated cylinder having a piston therein; a rigid support member attached to said piston; a plurality of short stroke, single acting fluid pressure actuated cylinders adjustably mounted on said support member and each having a piston; a wheel electrode operatively connected to each of said last pistons; a common source of fluid pressure connected to said single acting cylinders to maintain equal and constant pressure between each electrode and a work surface; and a second source of pressure connected to said double acting cylinder to move the electrodes collectively into contact with a work surface; said single acting cylinders being electrically insulated from said support member; and a source of welding current connected to each of said wheel electrodes.

3. A welding head, comprising: a long stroke, double acting, fluid pressure actuated cylinder having a piston therein; a rigid support member attached to said piston; a plurality of short stroke, single acting fluid pressure actuated cylinders adjustably mounted on said support member and each having a piston; each of said single acting cylinders having an extended sleeve portion, a block axially slidable and non-rotatably mounted in said sleeve portion and operatively coupled to the adjacent piston, an axle freely rotatably mounted in said block, and a wheel electrode fixed to one end of said axle; a common source of fluid pressure connected to said single acting cylinders to maintain equal and constant pressure between each electrode and a work surface; and a second source of pressure connected to said double acting cylinder to move the electrodes collectively into contact with a work surface; said single acting cylinders being electrically insulated from said support members; and a source of welding current connected to each of said wheel electrodes.

4. A welding head, comprising: a long stroke, double acting, fluid pressure actuated cylinder having a piston therein; a rigid support member attached to said piston; means for holding said support member against rotation relative to said cylinder; a plurality of short stroke, single acting, fluid pressure actuated cylinders each having a piston and being adjustably, rigidly mounted on said support member; each of said single acting cylinders having an extended sleeve portion, a block axially slidable and non-rotatably mounted in said sleeve portion and operatively coupled to the adjacent piston, an axle freely rotatably mounted in said block, and a wheel electrode fixed to one end of said axle; a common source of fluid pressure connected to said single acting cylinders to maintain equal and constant pressure between each electrode and a work surface; and a second source of pressure connected to said double acting cylinder to move the electrodes collectively into contact with a work surface; said single acting cylinders being electrically insulated from said support member; and a source of welding current connected to each of said wheel electrodes.

5. A welding head, comprising: a long stroke, double acting, fluid pressure actuated cylinder having a piston therein; a rigid support member attached to said piston; a plurality of short stroke, single acting fluid pressure actuated cylinders adjustably mounted on said support member and each having a piston; a wheel electrode operatively connected to each of said last pistons; a common source of fluid pressure connected to said single acting cylinder to maintain equal and constant pressure between each electrode and a work surface; and a second source of pressure connected to said double acting cylinder to move the electrodes collectively into contact with a work surface; the effective pressure applied to said double acting cylinder being slightly greater than the total pressure in said single acting cylinders.

References Cited in the file of this patent

UNITED STATES PATENTS

| | | |
|---|---|---|
| 2,163,590 | Ganahl et al. | June 27, 1939 |
| 2,300,700 | Porter et al. | Mar. 3, 1942 |